United States Patent [19]

Gubitz

[11] Patent Number: 5,518,225
[45] Date of Patent: May 21, 1996

[54] PNEUMATIC SPRING-VIBRATION DAMPER ASSEMBLY

[75] Inventor: Holger Gubitz, Schweinfurt, Germany

[73] Assignee: Fichtel & Sachs AG, Schweinfurt, Germany

[21] Appl. No.: 331,043

[22] Filed: Oct. 28, 1994

[30] Foreign Application Priority Data

Nov. 3, 1993 [DE] Germany .......................... 43 37 417.4
Aug. 24, 1994 [DE] Germany .......................... 44 29 992.3

[51] Int. Cl.$^6$ ........................................... F16F 9/08
[52] U.S. Cl. ........................ 267/64.24; 267/64.128
[58] Field of Search .................. 188/322.11, 322.16, 188/322.21; 267/64.21, 64.24, 64.27, 64.28; 280/711

[56] References Cited

U.S. PATENT DOCUMENTS

| | | | |
|---|---|---|---|
| 3,063,701 | 11/1962 | Long | 267/64.24 |
| 3,399,882 | 9/1968 | Hausmann | 267/64.21 |
| 3,819,166 | 6/1974 | Ellis et al. | 267/64.21 |
| 3,954,255 | 5/1976 | Keijzer et al. | 267/64.21 |
| 4,105,193 | 8/1978 | Long, Jr. | 267/64.21 |
| 4,141,572 | 2/1979 | Sorensen | 267/64.21 |

FOREIGN PATENT DOCUMENTS

| | | | |
|---|---|---|---|
| 8813045 | 2/1989 | Germany . | |
| 4107402 | 9/1992 | Germany | 267/64.28 |

*Primary Examiner*—Robert J. Oberleitner
*Assistant Examiner*—Chris Schwartz
*Attorney, Agent, or Firm*—Nils H. Ljungman & Associates

[57] ABSTRACT

Pneumatic spring, consisting of a spring bellows acting as a rolling bellows, whereby the spring bellows border a spring chamber provided with a gas charge under pressure, whereby the spring bellows are connected on one hand to a roll-off tube and on the other hand to an axially-movable outer tube, a connection to a compressed gas supply, whereby the outer tube is also actively connected to a vibration damper filled with damping medium and which has a cylinder in which a piston on the piston rod moves axially and which has a connection to an equalization chamber, whereby the unit consisting of the pneumatic spring and vibration damper contains fastening elements for the connection, whereby the roll-off tube and the cylinder form the equalization chamber, which is bordered on the end by a base of the roll-off tube.

3 Claims, 3 Drawing Sheets

5,518,225

PNEUMATIC SPRING-VIBRATION DAMPER ASSEMBLY

BACKGROUND OF THE INVENTION

1. Field of the Invention

This invention relates to a pneumatic spring-vibration damper assembly.

2. Background Information

A similar pneumatic spring is disclosed in Gm 88 13 045.2. One functional disadvantage of such a design is that a seal must be created by means of one or more O-rings between the vibration damper and the roll-off tube. Furthermore, all the axial forces must be transmitted by the roll-off tube to the vibration damper by means of a relatively small abutment, contact, or stop ring. A fundamental problem is the creation of a sufficiently large spring chamber, or the elimination of external supplemental volumes.

An additional problem is that during assembly, the roll-off tube can twist relative to the vibration damper. But the connection for a compressed gas source must be in a specified position or at a specified insertion length, so that in the vehicle, the pneumatic spring can be connected to the compressed gas source, and so that during the suspension process, collisions can be avoided between the connection and other components located in the vicinity of the installation. In similar devices of the prior art, the position of the roll-off tube had to be adjusted manually in such cases. On account of the friction resulting from the use of the O-rings, this process was time-consuming and required the application of significant forces.

Furthermore, in the event of unpressurized pneumatic spring movements, the roll-off tube can become twisted. Under unfavorable conditions, it is possible that inside the space in which the pneumatic spring is installed, the pneumatic connection can collide with another part and/or that the air line can be torn apart.

OBJECT OF THE INVENTION

The object of the invention is to solve the problems of the prior art, thereby simplifying the pneumatic spring and reducing its weight as much as possible.

SUMMARY OF THE INVENTION

The invention teaches that this object can be accomplished if the roll-off tube and the cylinder form the equalization chamber which is bordered on the end by a base of the roll-off tube. The problems related to the O-ring seal of the prior art can thereby be eliminated. An additional decisive advantage is that on account of the elimination of a container tube and an abutment ring, it also becomes possible to reduce the weight of the pneumatic spring and the number of parts required, with their negative effects regarding manufacturing tolerances, in particular with regard to ease of manufacture. The extra space which thereby becomes available can be used for a larger oil or compressed gas volume, with corresponding adaptations of the roll-off tube. The elimination of the container tube also facilitates the installation of a bypass valve, regardless of whether the bypass valve acts in the piston or via an intermediate tube. More space is also available, which can be utilized. The radial space gained also makes it possible to use a roll-off tube in cases in which it was previously impossible to use such a roll-off tube.

The invention teaches that the problem of the twisting of the connection relative to the fastening element can be solved if the roll-off tube has a fastening element and a connection so that the connection and the fastening element are stationary relative to one another. The equalization chamber is closed on the piston rod exit side by means of a threaded cap. If adjustments to the vibration damper are necessary, the pneumatic spring can advantageously be reclosed without damage. For large-scale series production, the roll-off tube can be made of plastic by injection molding or of a cast material such as a metal, whereby a flanged closing element is partly enclosed by the roll-off tube. Such a configuration results in significant advantages with regard to corrosion protection, which is altogether unnecessary with a plastic roll-off tube. A connecting line is advantageously laid between the connection and the spring chamber. During the manufacture of the roll-off tube, the connecting line is simply inserted into the production mold.

In an advantageous embodiment, the invention discloses that a locator for a fastening element is manufactured in one piece with the roll-off tube. There is no need for welding a lug or eye or a pin-type hinge. It does not usually matter whether the roll-off tube is made of plastic or a cast metal material, for example.

BRIEF DESCRIPTION OF THE DRAWINGS

The invention is described in greater detail below with reference to the accompanying figures.

DESCRIPTION OF THE PREFERRED EMBODIMENT

Figure 1:
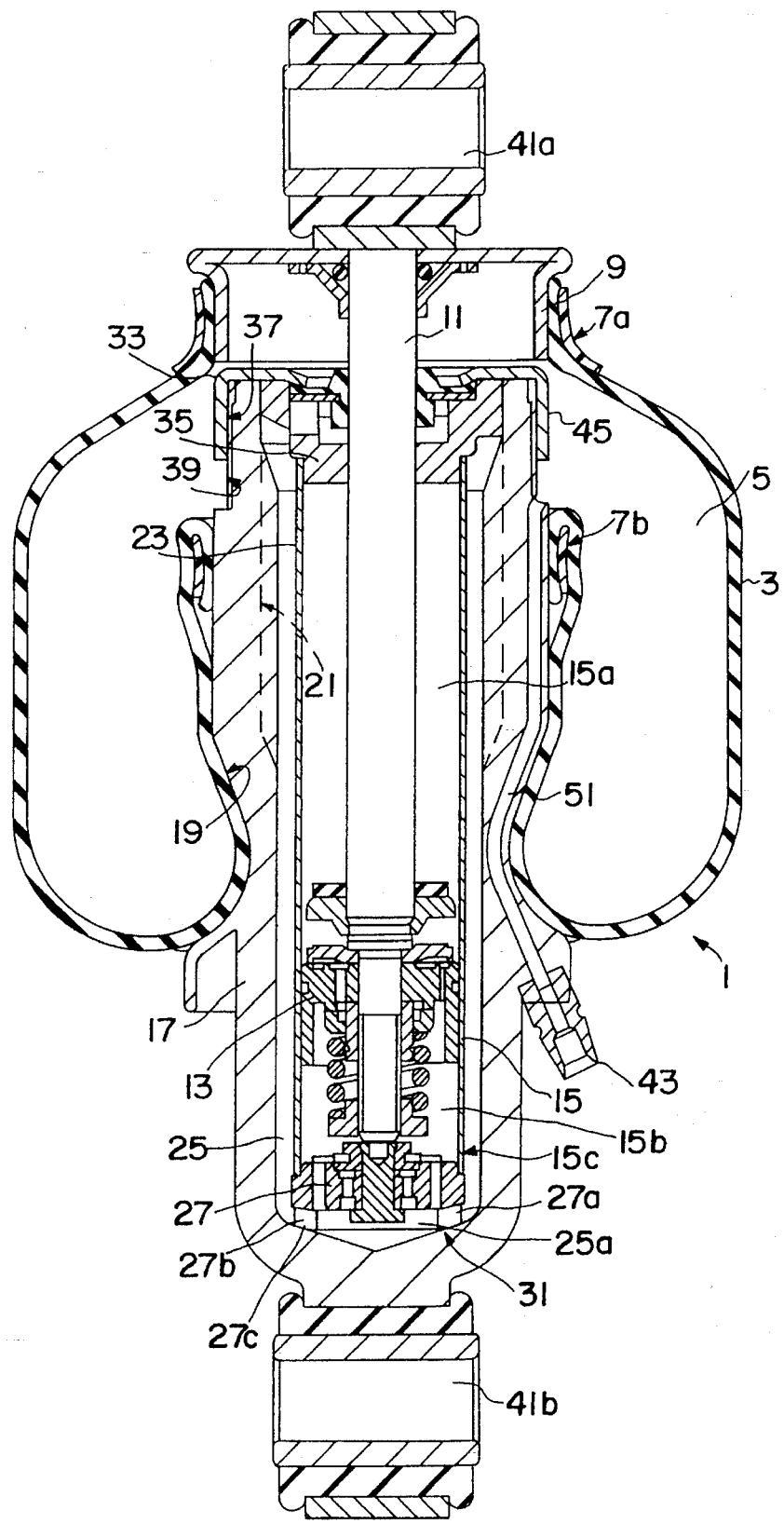
FIG. 1 shows a pneumatic spring with a screw-on cover.

FIG. 1 shows a pneumatic spring 1 which has rolling bellows functioning as spring bellows 3, which bellows 3 form the border of a spring chamber 5 under pressure. The spring bellows 3 are connected in a sealed manner by means of a belt-type tensioning element 7a with an outer tube 9, whereby the outer tube 9 is actively connected to a piston rod 11, which is located together with a piston 13 equipped with a damping valve so that it can move axially inside a cylinder 15. The spring bellows 3 are in turn connected in a sealed manner by means of a belt-type tensioning element 7b to a roll-off tube 17. The roll-off tube 17 has an external contour 19 which generates a defined spring force as a function of the stroke of the piston rod 11.

The inside diameter 21 of the roll-off tube 17 and the outside diameter 23 of the cylinder 15 of a shock absorber 15c form an equalization chamber 25 for the cylinder 15, which is connected to the equalization chamber 25 via a base valve 27. The equalization chamber 25 is connected to the working chambers 15a and 15b by a passage 25a between the bottom of the cylinder 15 and the inner portion of the bottom of the roll-off tube 17. The base valve 27 is thereby supported directly on a base 31 of the roll-off tube 17. The bottom of the shock absorber 15c has a ring element 27a with passages 27b and extensions 27c which abut the base 31. On the piston rod outlet side end of the pneumatic spring 1, a threaded cap 33 seals the equalization chamber 25, whereby a piston rod guide 35 centers the cylinder 15 relative to the inside diameter 21 of the roll-off tube 17. The threaded cap 33 has an internal thread 37 which is engaged with a threaded segment 39 on the roll-off tube 17. It thereby becomes possible to reclose the pneumatic spring 1 without damage.

The pneumatic spring 1 has fastening elements 41 in the form of a lug 41a on the piston rod 11 and a lug 41b on the roll-off tube 17. The lug 41b is designed so that it is one piece with the roll-off tube 17 which is preferably made either of injection-molded plastic or a cast metal material. A pressure connection 43 provided to charge the gas in the roll-off tube 17 is stationary relative to the lug 41b, so that the connection 43 cannot twist in relation to the lug 41b. The pressure connection 43 is connected to the spring chamber 5 by means of a connecting line 51 inserted inside the roll-off tube 17. The connecting line 51 can also be manufactured by machining, for example.

Figure 2:
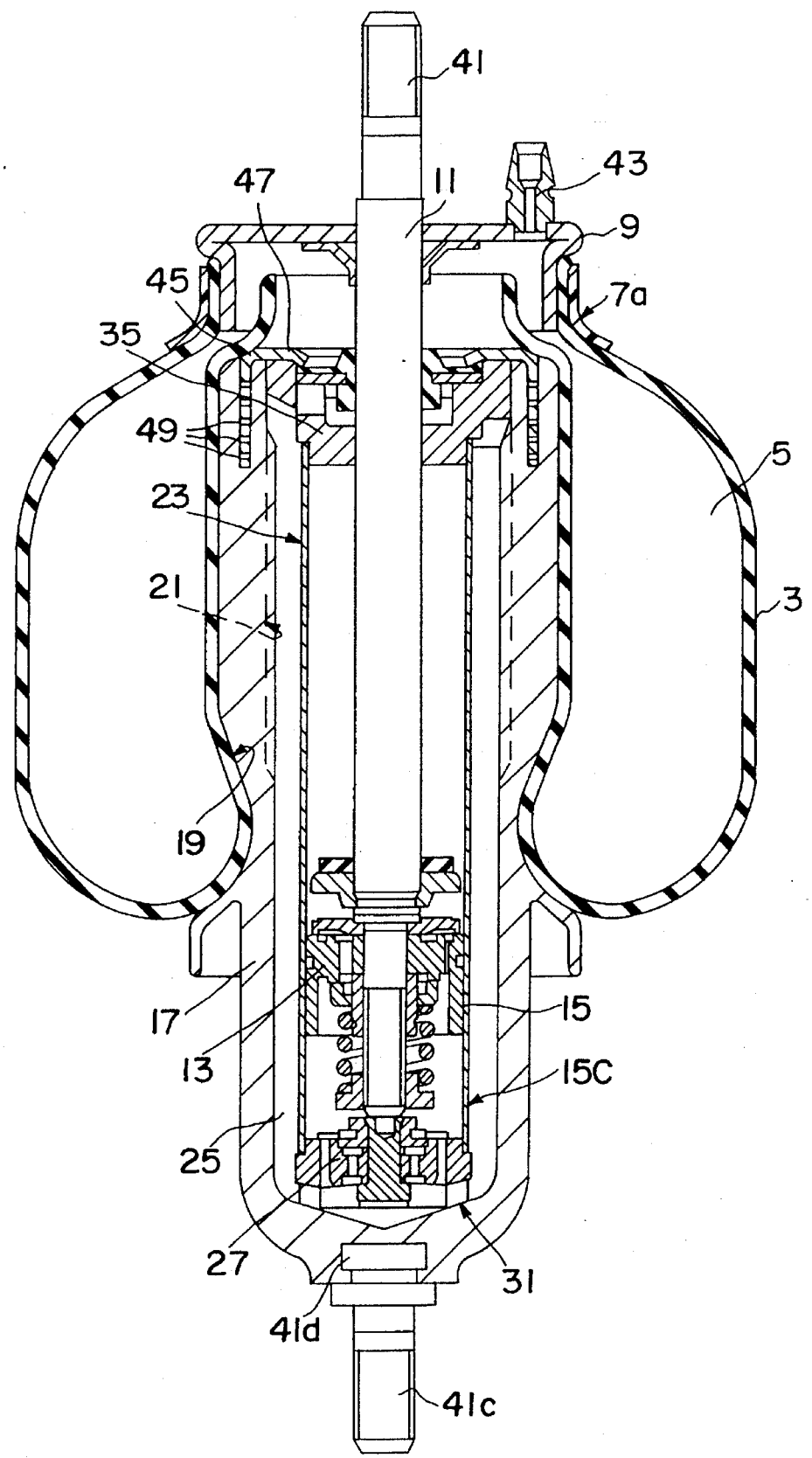
FIG. 2 shows a pneumatic spring with a flanged closing element.

FIG. 2 essentially differs from FIG. 1 in that a flanged closing element 45 is partly enclosed by the roll-off tube 17. Following assembly, the projecting web 47 is deformed by a flanging tool, so that the vibration damper part or shock absorber part 15 of the pneumatic spring 1 is closed. To increase the connecting forces which can be transmitted, the closing element 45 has openings 49 which are penetrated by the material of which the roll-off tube 17 is made. There is an additional difference in the fastening elements 41. A pin-type hinge 41c is enclosed by the roll-off tube 17 on its bracket 41d, so that even quite large forces can be reliably absorbed. Instead of a connecting line 51, the connection 43 is located in the outer tube 9. A relative movement between the outer tube 9 and the piston rod 11 can take place on account of a fastening of the outer tube 9 to a bearing. The fastening elements of FIG. 1 could be substituted for those of FIG. 2a in an alternative embodiment.

Figure 3:
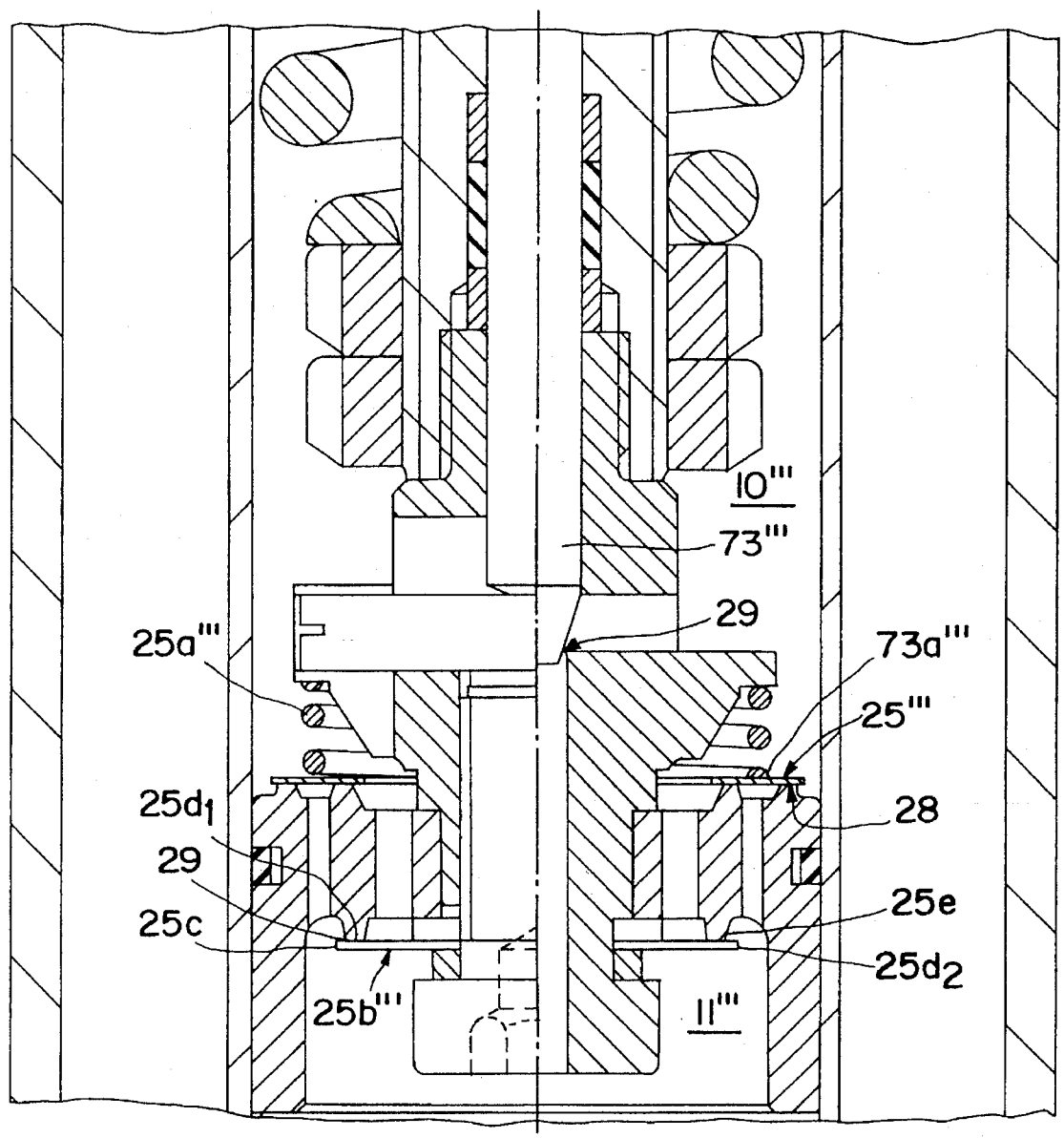
FIG. 3 is representative of the valve system for use in the embodiments of FIGS. 1 and 2

An embodiment of the base valve 27 shown in FIGS. 1 and 2 is illustrated in FIG. 3. FIG. 3 illustrates the piston of the shock absorber 11''' which corresponds to the shock absorber 15c of FIGS. 1 and 2. In the compression direction, a check valve 25''' acts, which in this variant can be adjusted by means of a piston rod 73''' in terms of its opening action. It is thereby possible that the check valve 25''' can generate an additional damping force 28 in the compression direction by means of its closing spring 25a'''. Alternatively, as shown in the right half of FIG. 3, a third advance opening cross section 29 can be influenced by the control rod 73''', in contrast to which, as shown on the left half of FIG. 3, a constant advance opening 29 is executed in the context of a pressure relief valve 25b''', in which there is a slot 25c in the valve seat 25d₁ or a valve disc 25d₂ provided with recesses inside the pressure relief valve. The pressure relief valve 25b''' consists of at least one valve disc which, above a specified pressure level, opens a connection between the working chamber 10''' on the piston rod side 73a''' and the working chamber 10''' away from the piston rod 73'''. The pressure relief valve 25b''' thereby trims the damping action of the hydraulic decompression stop. The advance opening 29 is used, among other things, to influence the adaptation of the decompression and compression damping on specified shock absorber sizes.

An essentially similar valve assembly could be used for the base valve 27.

One feature of the invention resides broadly in the pneumatic spring, consisting of spring bellows acting as a rolling bellows, whereby the spring bellows border a spring chamber provided with a gas charge under pressure, whereby the spring bellows are connected on one hand to a roll-off tube and on the other hand to an axially-movable outer tube, a connection to a compressed gas supply, whereby the outer tube is also actively connected to a vibration damper filled with damping medium and which has a cylinder in which a piston on the piston rod moves axially and which has a connection to an equalization chamber, whereby the unit consisting of the pneumatic spring and vibration damper contains fastening elements for the connection, characterized by the fact that the roll-off tube 17 and the cylinder 15 form the equalization chamber 25, which is bordered on the end by a base 31 of the roll-off tube 17.

Another feature of the invention resides broadly in the pneumatic spring characterized by the fact that the roll-off tube 17 has a fastening element and a connection 43 so that the connection 43 and the fastening element 41 are stationary relative to one another.

Yet another feature of the invention resides broadly in the pneumatic spring characterized by the fact that the equalization chamber 25 is closed by a threaded cap 33 on the piston rod exit side.

Still another feature of the invention resides broadly in the pneumatic spring characterized by the fact that the roll-off tube 17 is injection molded out of plastic or a cast material, whereby a closing element 45 which can be flanged or beaded or crimped is partly enclosed by the roll-off tube 17.

A further feature of the invention resides broadly in the pneumatic spring characterized by the fact that a connecting line 51 is inserted between the connection 43 and the spring chamber 5.

Another feature of the invention resides broadly in the pneumatic spring characterized by the fact that a locator for a fastening element 41 is designed in one piece with the roll-off tube 17.

Examples of pneumatic springs, alternatively termed as "air springs" or "air shocks", and components thereof, which may be utilized in accordance with the embodiments of the present invention may be found in the following U.S. Pat. Nos. 5,180,144, which issued to Hellyer et al. on Jan. 19, 1993; 5,009,401, which issued to Weitzenhof on Apr. 23, 1991; 4,988,082, which issued to Pees on Jan. 29, 1991; 4,332,397, which issued to Steger on Jun. 1, 1982; and 4,166,522, which issued to Bourcier on Sep. 4, 1979.

Examples of shock absorbers, which may be utilized in accordance with the embodiments of the present invention may be found in the following U.S. Pat. Nos. 4,838,393, entitled "Hydro-mechanical Stop having a Restrictive Passage", which issued to Mourray et al. on Jun. 13, 1989; U.S. Pat. No. 4,817,928, entitled "Suspension System", which issued to Paton on Apr. 4, 1989; 4,527,674, entitled "Shock Absorber with a Hydro-mechanical Stop", which issued to Mourray on Jul. 9, 1985; 4,962,916, entitled "Compression Spring", which issued to Palinkas on Oct. 16, 1990; and 4,756,516, entitled "Resiliently Deformable Element Usable as an End Stop in a Motor Vehicle Suspension", which issued to Tondato on Jul. 12, 1988.

Examples of suspension systems, which may be utilized in accordance with the embodiments of the present invention may be found in the following U.S. Pat. Nos. 5,286,059, entitled "Height Control System When Vehicle is Jacked Up," which issued to Tabe; 5,180,024, entitled "Vehicle Height Control Apparatus," which issued to Eto; 5,324,056, entitled "High Performance Automobile Suspension," which issued on Orton.

All, or substantially all, of the components and methods of the various embodiments may be used with at least one embodiment or all of the embodiments, if more than one embodiment is described herein.

The invention as described hereinabove in the context of the preferred embodiments is not to be taken as limited to all of the provided details thereof, since modifications and variations thereof may be made without departing from the spirit and scope of the invention.

What is claimed is:

1. A pneumatic spring and shock absorber assembly comprising:

a shock absorber, said shock absorber comprising:

a sealed cylinder defining a chamber therein, said cylinder containing a damping fluid, said cylinder having a first end and a second end;

a piston rod sealingly projecting into said cylinder and being axially displaceable with respect to said cylinder;

said first end of said cylinder being disposed at said piston rod;

a piston being attached to said piston rod, said piston being slidably disposed within said cylinder to sealingly divide said chamber into first and second chambers;

means for permitting flow of damping fluid between said first and second chambers;

said cylinder having an inner wall disposed towards said piston rod and an outer surface disposed radially away from said piston rod;

a central longitudinal axis defined through said sealed cylinder, the central longitudinal axis defining a longitudinal direction of said shock absorber;

a pneumatic spring for applying a substantially longitudinally directed force to said shock absorber;

said pneumatic spring comprising:

a roll-off tube surrounding at least a portion of said cylinder;

said roll-off tube having an inner surface disposed towards said cylinder;

said outer surface of said cylinder and said inner surface of said roll-off tube comprising an equalization chamber of said shock absorber;

means for connecting said equalization chamber with at least one of: said first chamber and said second chamber;

means for applying a substantially longitudinally directed force to said shock absorber;

said means for applying the substantially longitudinally directed force comprising membrane means for providing the substantially longitudinally directed force;

said membrane means being disposed to roll up on and roll off said roll-off tube;

an inlet for supplying pneumatic pressure to said pneumatic spring;

said roll-off tube having a first end and a second end;

said first end of said roll-off tube being disposed at least substantially adjacent said first end of said cylinder;

said second end of said roll-off tube being disposed substantially adjacent said second end of said cylinder;

said means for connecting said equalization chamber with at least one of: said first chamber and said second chamber comprising a space between said second end of said roll-off tube and said second end of said cylinder;

said cylinder being solid;

said cylinder comprising an inner surface;

said inner surface of said cylinder being in contact with fluid within said cylinder;

said outer surface of said cylinder and said inner surface of said roll-off tube together forming substantial portions of said equalization chamber;

said outer surface of said cylinder and said inner surface of said roll-off tube comprising facing cylindrical surfaces;

said outer surface of said cylinder and said inner surface of said roll-off tube comprising the sole facing cylindrical surfaces forming a substantial portion of said equalization chamber;

said shock absorber having a first end disposed adjacent said first end of said cylinder;

said first end of said roll-off tube and said first end of said shock absorber being disposed immediately adjacent one another;

said first end of said roll-off tube and said first end of said cylinder being in contact with one another and being sealed to to one another;

said shock absorber further comprising a fastening element for holding said first end of said roll-off tube and said first end of said shock absorber sealingly together;

said fastening element being embedded in said first end of said roll-off tube;

said roll-off tube being injection molded from a metal material;

said inlet for supplying pneumatic pressure to said pneumatic spring comprising a connecting line disposed along a substantial portion of said roll-off tube; and said connecting line being molded into said roll-off tube.

2. The assembly according to claim 1 wherein said second end of said roll-off tube further comprises a fastening element for fastening said pneumatic spring and said shock absorber assembly to a vehicle.

3. A pneumatic spring and vibration damper assembly comprising:

a vibration damper, said vibration damper comprising:

a sealed cylinder defining a chamber therein, said cylinder containing a damping fluid;

said cylinder having a first end and a second end;

a piston rod sealingly projecting into said cylinder and being axially displaceable with respect to said cylinder;

said first end of said cylinder being disposed at said piston rod;

a piston being attached to said piston rod, said piston being slidably disposed within said cylinder to sealingly divide said chamber into first and second chambers;

means for permitting flow of damping fluid between said first and second chambers;

said cylinder having an inner wall disposed towards said piston rod and an outer wall disposed radially away from said piston rod;

a central longitudinal axis defined through said sealed cylinder, the central longitudinal axis defining a longitudinal direction of said vibration damper;

a pneumatic spring for applying a substantially longitudinally directed force to said vibration damper;

said pneumatic spring comprising:

a roll-off tube surrounding at least a portion of said cylinder;

said roll-off tube having an inner surface disposed towards said cylinder;

said outer surface of said cylinder and said inner surface of said roll-off tube comprising an equalization chamber of said vibration damper;

means for connecting said equalization chamber with at least one of said first and said second chambers;

means for applying a substantially longitudinally directed force to said vibration damper;

said means for applying the substantially longitudinally directed force comprising membrane means for providing the substantially longitudinally directed force;

said membrane means being disposed to roll up on and roll off said roll-off tube;

an inlet for supplying pneumatic pressure to said pneumatic spring;

said roll-off tube having a first end and a second end;

said first end of said roll-off tube being disposed at least substantially adjacent said first end of said cylinder;

said second end of said roll-off tube being disposed substantially adjacent said second end of said cylinder;

said cylinder being solid;

said cylinder comprising an inner surface;

said inner surface being in contact with fluid within the cylinder;

said means for connecting said equalization chamber with at least one of: said first chamber and said second chamber comprising a space between said second end of said roll-off tube and said second end of said cylinder;

said outer surface of said cylinder and said inner surface of said roll-off tube forming substantial portions of said equalization chamber;

said outer surface of said cylinder and said inner surface of said roll-off tube comprising facing cylindrical surfaces;

said outer surface of said cylinder and said inner surface of said roll-off tube comprising the sole facing cylindrical surfaces forming a substantial portion of said equalization chamber;

said vibration damper having a first end disposed adjacent said first end of said cylinder;

said first end of said roll-off tube and said first end of said vibration damper being immediately adjacent one another;

said first end of said roll-off tube and said first end of said cylinder being in contact with one another and are sealed to to one another;

a fastening element for holding said first end of said roll-off tube and said first end of said vibration damper sealingly together;

said roll-off tube being molded out of one of:
  a plastic material; and
  a metal material;

said inlet for supplying pneumatic pressure to said pneumatic spring comprising a connecting line disposed along a substantial portion of said roll-off tube;

said connecting line being molded into said roll-off tube; and said second end of said roll-off tube further comprising:
  a fastening element for fastening said pneumatic spring and said vibration damper assembly to a vehicle.

* * * * *

UNITED STATES PATENT AND TRADEMARK OFFICE
CERTIFICATE OF CORRECTION

PATENT NO.  : 5,518,225
DATED       : May 21, 1996
INVENTOR(S) : Holger GUBITZ

It is certified that error appears in the above-indentified patent and that said Letters Patent is hereby corrected as shown below:

On the title page, item [56], before the '8813045' reference, insert the following references:
--1807431    6/1969    Germany
  2097305    3/1972    France--.

In column 4, line 49, before 'on', delete "Mourrary" and insert --Mourray--.

Signed and Sealed this

Twenty-fifth Day of March, 1997

Attest:

BRUCE LEHMAN

*Attesting Officer*    *Commissioner of Patents and Trademarks*